US007846019B2

(12) United States Patent
Okada

(10) Patent No.: US 7,846,019 B2
(45) Date of Patent: Dec. 7, 2010

(54) SLOT MACHINE AND PLAYING METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 587 days.

(21) Appl. No.: 11/635,027

(22) Filed: Dec. 7, 2006

(65) Prior Publication Data

US 2008/0045307 A1 Feb. 21, 2008

Related U.S. Application Data

(60) Provisional application No. 60/838,363, filed on Aug. 18, 2006.

(51) Int. Cl.
*G06F 17/00* (2006.01)

(52) U.S. Cl. ........................................................ 463/20

(58) Field of Classification Search .............. 463/16–25
See application file for complete search history.

(56) References Cited

U.S. PATENT DOCUMENTS

| | | | | |
|---|---|---|---|---|
| 6,012,983 | A | 1/2000 | Walker et al. | |
| 6,960,133 | B1 | 11/2005 | Marks et al. | |
| 2007/0265061 | A1 * | 11/2007 | Marks et al. | 463/20 |
| 2008/0026818 | A1 * | 1/2008 | Okada | 463/20 |
| 2008/0045307 | A1 | 2/2008 | Okada | |
| 2008/0051173 | A1 * | 2/2008 | Okada | 463/20 |
| 2008/0058085 | A1 * | 3/2008 | Saito | 463/20 |

FOREIGN PATENT DOCUMENTS

| | | |
|---|---|---|
| CN | 1575838 A | 2/2005 |
| CN | 1589939 A | 3/2005 |
| CN | 1647843 A | 8/2005 |

* cited by examiner

*Primary Examiner*—Ronald Laneau
(74) *Attorney, Agent, or Firm*—NDQ&M Watchstone LLP

(57) ABSTRACT

In a base game, a first payout is provided when a winning combination of "BELL", "CHERRY", or "PLUM" has come to a stop on a payline L. On the other hand, a second payout is provided when the "BELL" symbols in a predetermined number have come to a stop on a display area. The payout process of the first payout and the second payout is executed.

12 Claims, 14 Drawing Sheets

FIG. 3

| | 28a | 28b | 28c | 28d | 28e |
|---|---|---|---|---|---|
| CODE NO. | SYMBOL | SYMBOL | SYMBOL | SYMBOL | SYMBOL |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | LOBSTER | BELL | ORANGE | BELL | PLUM |
| 05 | PLUM | LOBSTER | PLUM | PLUM | BLUE 7 |
| 06 | ORANGE | PLUM | LOBSTER | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | BELL | BELL | CHERRY |
| 11 | BELL | STRAWBERRY | PLUM | LOBSTER | PLUM |
| 12 | ORANGE | PLUM | BELL | PLUM | CRAB |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CRAB | CHERRY |
| 17 | CRAB | STRAWBERRY | CRAB | BELL | LOBSTER |
| 18 | ORANGE | CRAB | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 4

| 28a | 28b | 28c | 28d | 28e | PAYOUT |
|---|---|---|---|---|---|
| APPLE | APPLE | APPLE | APPLE | APPLE | BONUS GAME |
| BELL | BELL | BELL | BELL | BELL | 25 COINS |
| CHERRY | CHERRY | CHERRY | CHERRY | CHERRY | 20 COINS |
| PLUM | PLUM | PLUM | PLUM | PLUM | 5 COINS |
| ⋮ | ⋮ | ⋮ | ⋮ | ⋮ | ⋮ |
| SCATTER SYMBOLS SIX OF BELL | | | | | 3 COINS |
| ⋮ | | | | | |

(SCROLL PROCESS OF SYMBOLS)

SLOT MACHINE AND PLAYING METHOD THEREOF

CROSS-REFERENCE TO RELATED APPLICATION

This application is based upon and claims the benefit of U.S. Provisional Patent Application Ser. No. 60/838,363, filed on Aug. 18, 2006; the entire contents of which are incorporated herein by reference for all purposes.

BACKGROUND OF THE INVENTION

1. Field of the Invention

The present invention relates to a slot machine that executes games using game media such as coins or bills, and a playing method thereof.

2. Description of Related Art

With conventional slot machines, such as those disclosed in U.S. Pat. No. 6,960,133B1 or U.S. Pat. No. 6,012,983, a plurality of symbols are scrolled on a display provided in front of a cabinet when a player inserts game media such as tokens, coins, or bills into the insertion slot of the slot machine and presses a spin button, and subsequently, respective symbols automatically come to a stop.

At this time, a random number is generated at the start of scrolling respective symbols, which is triggered by pressing the spin button. If it is arbitrarily determined by the random number to payout coins or credits associated with awards such as a mystery bonus, or to transit to a bonus game such as the second game, transition from the base game to the bonus game occurs and the bonus game is executed.

Here, the slot machine is configured so as to payout a payout in accordance with a winning state that occurs with the progress of the game. With such a slot machine, the symbols being scrolled merely stop automatically.

SUMMARY OF THE INVENTION

The slot machine according to a first aspect of the present invention comprises a display and a controller. A plurality of symbols that have been arranged are rearranged on the display. The controller is operable to provide a payout on at least one of a condition where a specific combination of the symbols is rearranged on a payline set on the display and a condition where specific symbols in a predetermined number are rearranged on the display.

With the slot machine of the first aspect of the present invention, a payout is provided for the rearrangement of a specific combination of the symbols when the specific combination of the symbols is rearranged on a payline set on a display. In addition, a payout is provided for the rearrangement of specific symbols in a predetermined number when the specific symbols in the predetermined number are rearranged on the display. Further, it can be designed such that the payout for the rearrangement of the specific symbols in the predetermined number is provided only when the specific combination of the symbols is not rearranged on the payline. Therefore, there is the case where the payout is provided when the specific symbols in the predetermined number are rearranged even if the specific combination of the symbols is not rearranged. Furthermore, it can be designed such that the payout for the rearrangement of the specific combination of the symbols and the payout for the rearrangement of the specific symbols in the predetermined number are provided altogether when the specific combination of the symbols is rearranged on the payline and the specific symbols in the predetermined number are rearranged on the display. Therefore, a larger payout amount may be provided.

The slot machine according to a second aspect of the present invention comprises a display and a controller. On a display, a plurality of symbols that have been arranged are rearranged in a unit game and a payline for a payout is set. During the unit game, the controller is operable to provide a first payout when a specific combination of the symbols is rearranged on the payline and provide a second payout when specific symbols in a predetermined number are rearranged on the display.

With the slot machine of the second aspect of the present invention, a first payout is provided for the rearrangement of a specific combination of the symbols when the specific combination of the symbols is rearranged on a payline set on a display. In addition, a second payout is provided for the rearrangement of specific symbols in a predetermined number on the display when the specific symbols in the predetermined number are rearranged on the display. In addition, the second payout can be provided only when the first payout is not caused to occur. Alternatively, the first payout and the second payout can be provided altogether.

The slot machine according to a third aspect of the present invention comprises a display and a controller. The display has a display area in the shape of a matrix formed by a plurality of columns and a plurality of rows. A payline for a payout is set on the display area. The controller is operable to execute a rearrangement control to rearrange symbols determined arbitrarily among a plurality of kinds of symbols on the display area after scrolling the symbols. The controller is also operable to provide the payout on at least one of a condition where a specific combination of the symbols is rearranged on the payline and a condition where specific symbols in a predetermined number are rearranged on the display.

With the slot machine of the third aspect of the present invention, a payout is provided for the rearrangement of a specific combination of the symbols when the specific combination of the symbols is rearranged on a payline set on the display. In addition, a payout is provided for the rearrangement of specific symbols in a predetermined number when the specific symbols in the predetermined number are rearranged on the display. The payout can be made for the rearrangement of the specific symbols in the predetermined number only when the specific combination of the symbols is not rearranged on the payline. Alternatively, the payout for the rearrangement of the specific combination of the symbols on the payline and the payout for the rearrangement of the specific symbols in the predetermined number can be provided altogether.

The playing method of the slot machine according to a fourth aspect of the present invention rearranges a plurality of symbols that have been arranged on a display on which a payline for a payout is set. And the payout is provided by a controller on at least one of a condition where a specific combination of the symbols is rearranged on the payline and a condition where specific symbols in a predetermined number are rearranged on the display.

With the playing method of a slot machine of the fourth aspect of the present invention, a payout is provided for the rearrangement of a specific combination of the symbols when the specific combination of the symbols is rearranged on a payline set on a display. In addition, a payout is provided for the rearrangement of specific symbols in a predetermined number when the specific symbols in the predetermined number are rearranged on the display.

The playing method of the slot machine according to a fifth aspect of the present invention arranges a plurality of symbols on a display. A plurality of symbols for rearrangement of the plurality of the arranged symbols is determined by a controller and the plurality of the arranged symbols on the display is rearranged. And a first payout is provided when a specific combination of the symbols is rearranged on the payline and a second payout is provided when specific symbols in a predetermined number are rearranged on the display.

With the playing method of a slot machine of the fifth aspect of the present invention, a first payout for the arrangement of a specific combination of the symbols is provided when the specific combination of the symbols is rearranged on a payline set on a display. In addition, a second payout for the arrangement of specific symbols in a predetermined number is provided when the specific symbols in the predetermined number are rearranged on the display.

The playing method of the slot machine according to a sixth aspect of the present invention executes unit games repeatedly. Each of unit games is started by scrolling a plurality of symbols on a display by the control of a controller and ended by causing the plurality of scrolled symbols to come to a stop in the rearrangement of a plurality of symbols determined by the controller. The playing method of the slot machine according to a sixth aspect of the present invention comprises following steps. In a first step, symbols are rearranged on the display on which a payline is set. In a second step, it is determined whether a specific combination of the symbols is rearranged on the payline. In a third step, it is determined whether specific symbols in a predetermined number are rearranged on the display. In a fourth step, a first payout is provided when the specific combination of the symbols is rearranged on the payline and a second payout is provided when the specific symbols in the predetermined number are rearranged on the display.

With the playing method of a slot machine of the sixth aspect of the present invention, symbols are rearranged on the display in the first step and a first payout is provided for the rearrangement of the specific combination of the symbols in the fourth step when it has been determined that the specific combination of the symbols is rearranged on the payline in the second step. Further, a second payout is provided for the rearrangement of the specific symbols in the predetermined number in the fourth step when it has been determined in the third step that the specific symbols in the predetermined number are rearranged on the display. Furthermore, the second payout for the rearrangement of the specific symbols in the predetermined number can be provided only when the specific combination of the symbols is not rearranged. Alternatively, the payout for the rearrangement of the specific combination of the symbols and the payout for the rearrangement of the specific symbols in the predetermined number can be provided altogether.

BRIEF DESCRIPTION OF THE DRAWINGS

FIG. 3 is a diagram illustrating symbols and code numbers of the respective symbols to be displayed in five columns of display areas of the slot machine according to the one embodiment of the present invention.

FIG. 4 is a diagram illustrating a payout table indicating the relation between combinations associated payouts and payout amount thereof.

DESCRIPTION OF THE PREFERRED EMBODIMENTS

Figure 1:
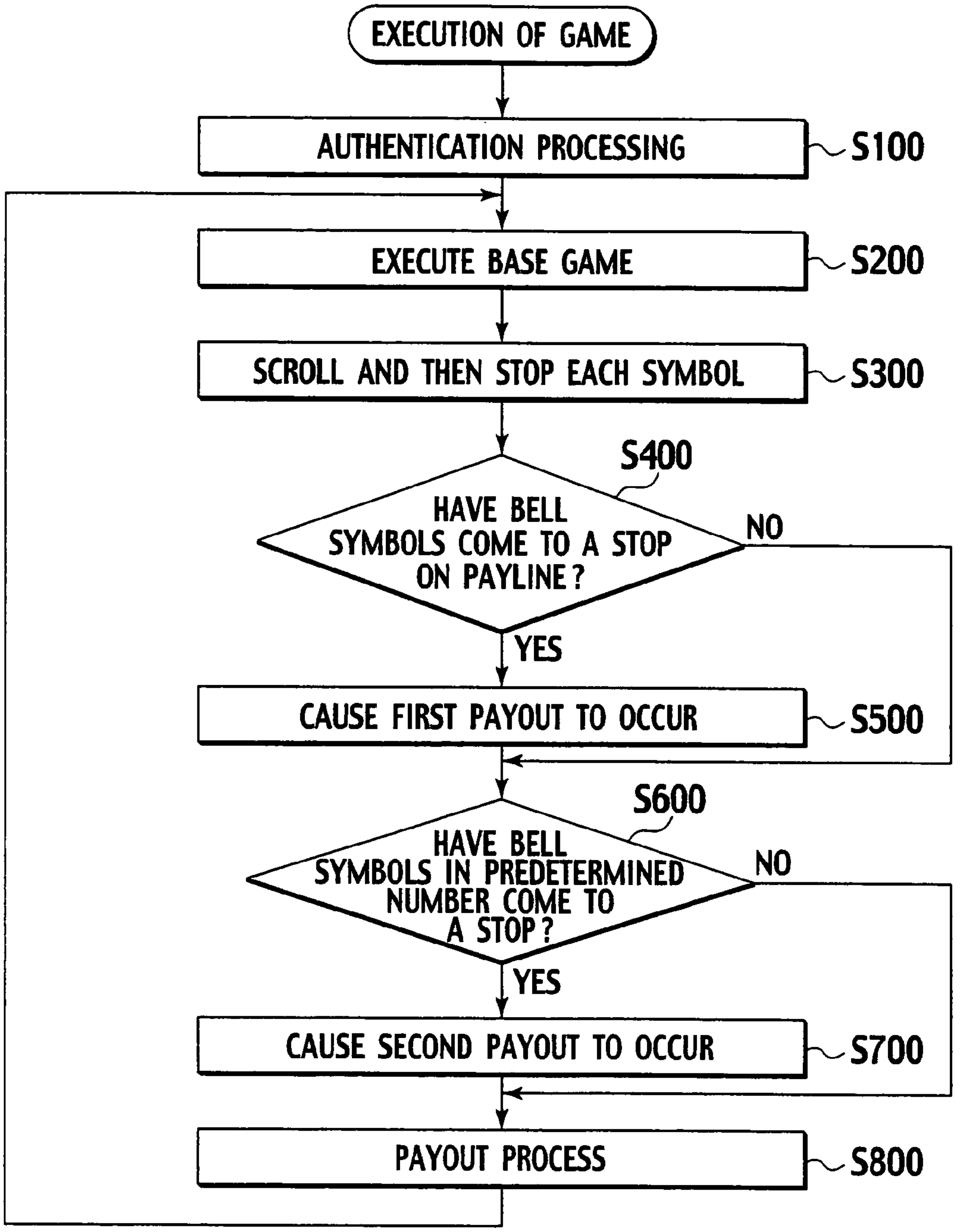
FIG. 1 is a flow chart generally illustrating a playing method of a slot machine according to the present invention.

FIG. 1 is a flow chart generally illustrating a playing method of a slot machine according to the present invention. The general operation of the slot machine and the playing method according to the present invention will be described below, referring to the flow chart shown in FIG. 1 and the perspective view shown in FIG. 2.

When the slot machine according to the present invention is powered on and starts up, a authentication processing is executed first (step S100). In this authentication processing, an initial checking processing is executed, prior to starting the unit game, in order to determine whether or not the program for operating the system is normally activated, whether or not the program has been falsified, etc.

Next, the base game is executed (step S200). In the base game, when a spin button 23 is pressed by a player with a desired number of credits being bet, such as by insertion of a coin into a coin insertion slot 21 by the player, the symbols start to scroll on each of display areas 28 (28*a* to 28*e*) of an LCD (Liquid Crystal Display) 17 inside a display window 15 provided on the front side of a cabinet 11. Subsequently, a unit game is executed in which scrolling is stopped to bring (rearrange) the symbols to a stop on each of the display areas 28 (step S300).

In each unit game, a process for determining the symbols to be stopped on each of the display areas 28 (28*a* to 28*e*) is executed. It is determined whether or not a combination as a winning combination of the specific symbols, for example, a combination of all the symbols of the "BELL" on a payline L, has come to a stop on the payline L provided on the middle portion of each of the display areas 28 (step S400).

When the winning combination of all the symbols of the "BELL" has come to a stop on the payline L, a first payout based on a predetermined payout table is made (step S500).

On the other hand, when the winning combination of the symbols of the "BELL" has not come to a stop on the payline L, it is determined whether or not the specific symbols of the "BELL" in a predetermined number have come to a stop on the display areas 28 (28*a* to 28*e*) (step S600).

When the specific symbols of the "BELL" in a predetermined number have come to a stop on the display areas 28 (28*a* to 28*e*), the second payout based on the predetermined payout table is caused to occur (step S700).

Then, the total of the first payout and the second payout that have been caused to occur is paid out (step S800).

Therefore, even if a combination, which will be a winning combination, has not come to a stop on the payline L, the player can receive payout when specific symbols, such as the "BELL", in a predetermined number come to a stop on the display areas 28 (28*a* to 28*e*), therefore, the player can get a larger payout amount.

By the way, in the above-mentioned example, an example is explained in which symbols are stopped and displayed in the 5-column×3-row display areas 28 (28*a* to 28*e*) inside the display window 15, however, the present invention is not limited to the 5-column×3-row display area 28.

Further, in the above-mentioned example, an example is explained in which symbols are displayed in each of the display areas 28 using the LCD 17, however, a configuration may be possible in which symbols are scrolled inside the display window 15 by rotating and stopping mechanical, cylinder-shaped spinning reels on the side surface on which a plurality of symbols are drawn.

In addition, in the above-mentioned example, an example is shown, in which the symbols are scrolled vertically relative to each of the display areas 28 (28*a* to 28*e*) and subsequently stopped (rearranged) in the base game. However, the symbols may be switched over (rearranged) on each of the display areas 28 (28*a* to 28*e*) respectively and individually.

Next, a configuration of a slot machine 10 according to one embodiment of the present invention will be explained, referring to the perspective view shown in FIG. 2. The slot machine 10 is installed in a gaming facility.

With the slot machine 10, a coin, a bill, or electronic value information corresponding to these is used as game media for executing a unit game. However, in the present invention, the game media is not limited in particular and may include a medal, a token, an electronic money, a ticket, or the like, for example. In addition, the above-mentioned ticket may include but not limited to a bar-coded ticket described below, for example.

Figure 2:
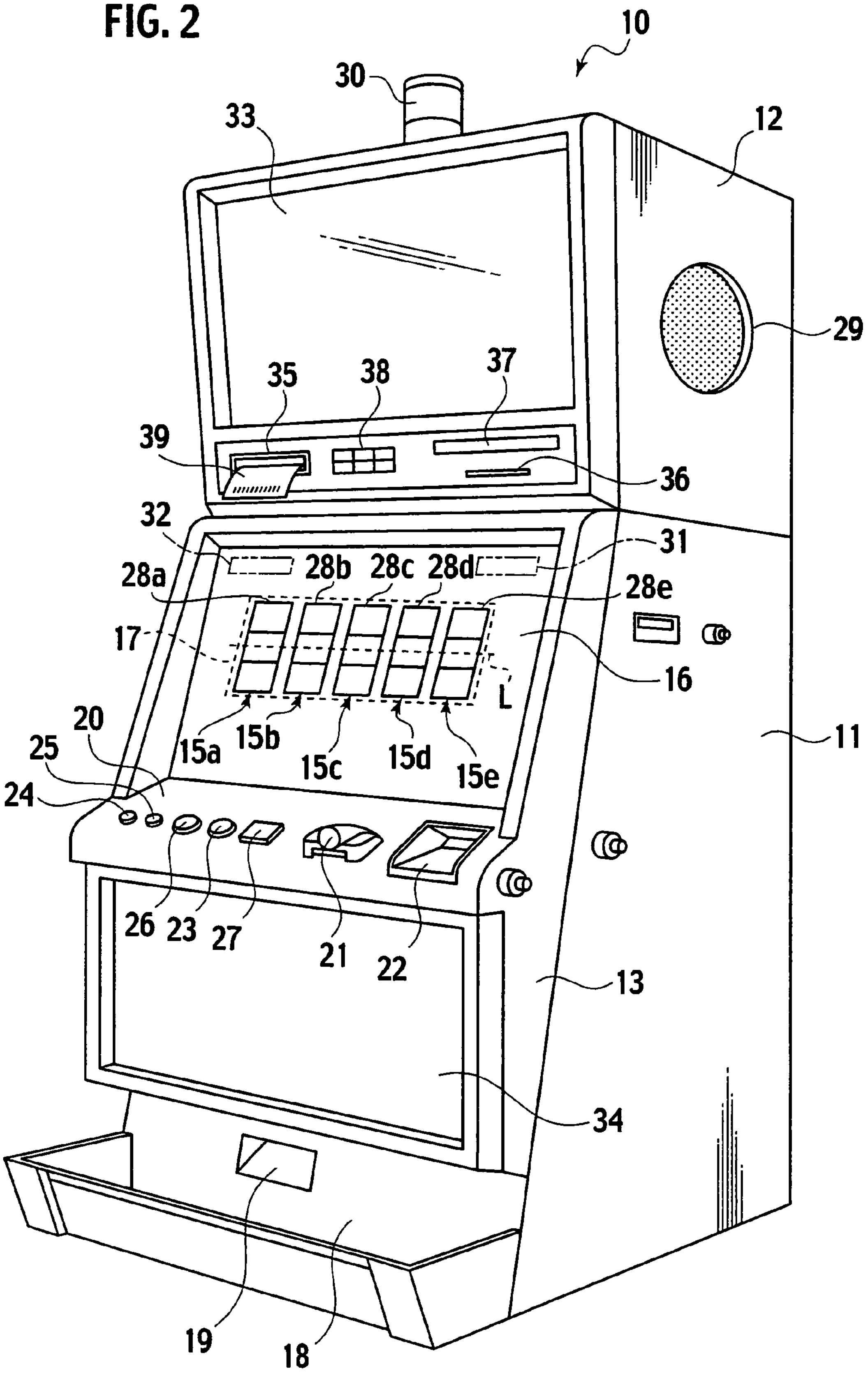
FIG. 2 is a perspective view illustrating the appearance of a slot machine according to one embodiment of the present invention.

As shown in FIG. 2, the slot machine 10 comprises the cabinet 11, a top box 12 provided on the top of the cabinet 11, and a main door 13 provided on the front side of the cabinet 11.

Inside the cabinet 11, the LCD 17 is provided for scrolling a 5-column×3-row matrix of symbols inside the display window 15. The LCD 17 comprises the display areas 28 (28*a* to 28*e*) for displaying the 5-column×3-row matrix of symbols. In other words, when the base game is executed, the symbols are scrolled in the 5-column×3-row matrix of the display areas 28 (28*a* to 28*c*), allowing the player to view the symbols being scrolled through the display window 15.

Here, in the present embodiment, a 5-column×3-row matrix of the display areas 28 (28*a* to 28*c*) of the LCD 17 is described as an exemplary display. However, the symbols may be displayed through the display window 15 by spinning and subsequently stopping mechanical reels with the symbols displayed on their side. Also, the matrix of the display areas 28 is not limited to five columns and three rows.

In front of the LCD 17 in the main door 13 is provided a lower display panel 16. The lower display panel 16 has a transmissive liquid crystal panel to display, during the game, various information or staging images relating to the game in the lower image display panel 16.

A number-of-credits display unit 31 and a payout amount display unit 32 are provided in the lower display panel 16. The number of coins having been credited is displayed as images on the number-of-credits display unit 31. The number of coins to be paid out is displayed as images on the payout amount display unit 32, if the combination of the symbols that has come to a stop on the payline L described below turns out to be a winning combination.

On the lower display panel 16 is provided the display window 15 that allows to view the symbols displayed on the five columns of the display areas 28 (28*a* to 28*e*) of the LCD 17 provided inside thereof. In addition, the single payline L horizontally crossing the display areas 28 (28*a* to 28*e*) is formed along the middle portion of the display areas 28 (28*a* to 28*e*), which is viewed through the display window 15. The payline L defines combinations of the symbols. If a combination of the symbols that has come to a stop on the payline L turns out to be a winning combination, a number of coins according to the winning combination and the number of coins inserted (number of bets) are paid out.

Here, in the present embodiment, an example is described in which the single payline L is set. However, three paylines horizontally crossing the top, middle, and bottom portions of the 5-column×3-row display areas 28 (28*a* to 28*e*), which is viewed through the display window 15, or a payline running diagonally (V-shaped, inverted V-shaped, etc.), for example, may be formed. In this case, one or more paylines are activated according to the number of the coins inserted, and when a winning combination is achieved on the activated payline, coins in the number corresponding to the combination are paid out.

Furthermore, a touch screen 69 (see FIG. 5) is provided on the front side of the lower display panel 16, allowing the player to operate the touch screen 69 to input various commands.

At the bottom of the lower display panel 16 are provided a control panel 20 having a plurality of buttons 23 to 27 through which commands with regard to the progress of the game are entered by the player, the coin insertion slot 21 for accepting coins into the cabinet 11, and a bill validator 22.

The control panel 20 has the spin button 23, a change button 24, a cash out button 25, a 1-bet button 26, and a maximum bet button 27 provided therein. The spin button 23 is a button for inputting a command to start scrolling of the symbols displayed on the display areas 28. The change button 24 is a button used when requesting money exchange to the crew of a gaming facility. The cash out button 25 is a button for entering commands to pay out the credited coins into a coin tray 18.

The 1-bet button 26 is a button for inputting a command to bet a single coin on the game among the coins that have been credited. The maximum bet button 27 is a button for inputting a command to bet on the game a maximum number (e.g., 50) of coins allowed to be bet on a single game among those that have been credited.

The bill validator 22 identifies whether or not the bill is legitimate and accepts legitimate bills into the cabinet 11. Here, the bill validator 22 may be configured so as to be able to read a bar-coded ticket 39 described below. A berry glass 34 having characters of the slot machine 10 drawn thereon is provided on the lower front side of the main door 13, i.e. at the bottom of control panel 20.

On the front side of the top box 12 is provided an upper display panel 33. The upper display panel 33 comprises a liquid crystal panel to display images representing staging images, introduction of game contents, and explanation of the game rules, for example.

In addition, a loudspeaker 29 for audio output is provided on the top box 12. At the bottom of the upper display panel 33 are provided a ticket printer 35, a card reader 36, a data display unit 37, and a key pad 38. The ticket printer 35 prints bar codes on the ticket, which are coded data such as the number of credits, date/time, and the identification number of the slot machine 10 and outputs the ticket as the bar-coded ticket 39. The player can play games on other slot machines using the bar-coded ticket 39, or exchange the bar-coded ticket 39 with bills at the cashier of the gaming facility.

The card reader 36 reads and writes data from and to a smart card. The smart card is a card carried by the player, and stores data used for identifying the players or data relating to the gaming history played by the player.

The data display unit 37 comprises a fluorescent display or the like, and data read by the card reader 36 or data entered by the player using the key pad 38, for example, is displayed on the data display unit 37. To the key pad 38, commands or data with regard to ticketing are input.

FIG. 3 is an explanatory list of columns of symbols to be scrolled on each of the display areas 28 (28*a* to 28*e*) provided on the LCD 17 installed in the cabinet 11. As shown in FIG. 3, columns of a total of 22 symbols composed of code numbers "00" to "21", respectively, are scrolled on each of the display areas 28 (28*a* to 28*e*). The columns of symbols are different for each of the display areas 28 (28*a* to 28*e*).

The symbols to be displayed on each of the display areas 28 (28*a* to 28*e*) are composed by combining the symbols "JACKPOT 7", "BLUE 7", "BELL", "CHERRY", "STRAWBERRY", "PLUM", "ORANGE", "APPLE", "LOBSTER", and "CRAB". In addition, a winning combination associated with payout is set according to combination of the above symbols. Additionally, a payout table is set for determining the payout amount when a winning combination is achieved on the payline L.

FIG. 4 is a diagram illustrating the payout table. The payout table is selected when the base game is being executed. As shown in FIG. 4, a bonus trigger is invoked when the symbols of the "APPLE" have come to a stop on the payline L set across the five columns of the display areas 28 (28*a* to 28*e*), shifting the game state from the base game to the bonus game.

In addition, when a combination of the symbols of the "BELL", which is a predetermined symbol, has come to a stop on the payline L, payout of 25 coins is made. When the symbols of the "CHERRY" have come to a stop on the payline L, payout of 20 coins is made. When the symbols of the "PLUM" have come to a stop on the payline L, payout of five coins is made. When six (predetermined number) symbols of the "BELL" set as scatter symbol have come to a stop on the fifteen (5-column×3-row) display areas 28 (28*a* to 28*e*), payout of three coins is made.

The bonus game, which is executed when a combination of the symbols of the "APPLE" has come to a stop on the payline L, is a more advantageous game state than the base game. In the present embodiment, the bonus game is a free game (a game that can be played a predetermined number of times without betting coins). In the present invention, the bonus game is not particularly limited as long as it provides the player with an advantageous game state. Additionally, the bonus game that is advantageous to the player is not particularly limited as long as it is more advantageous than the base game. There may be a variety of more advantageous states, for example, such as a state in which more game media can be obtained than the base game, a state in which game media can be obtained with a higher probability than the base game, a state in which a smaller amount of game media is consumed than the base game, and so on. Specifically, bonus games may include a free game, a second game, or the like.

Scrolling of the symbols displayed (arranged) on each of the display areas 28 (28*a* to 28*e*) starts when the 1-bet button 26 or the maximum bet button 27 is pressed and, subsequently, the spin button 23 is pressed. After a predetermined time period has passed since the scrolling of respective symbols started, scrolling of respective symbols is stopped (rearranged). At this time, any symbol of the column of symbols on each of the display areas 28 (28*a* to 28*e*) shown in FIG. 3 comes to a stop in the display areas 28 (28*a* to 28*e*) inside the display window 15.

Furthermore, various winning combinations (see FIG. 4) are predetermined for respective symbols and a certain number of coins corresponding to the winning combination are added to the credits possessed by the player when symbols composing a winning combination have come to a stop on the payline L. In addition, when a bonus game trigger is achieved, that is, when a combination of the five symbols of the "APPLE" has come to a stop on the payline L in the present embodiment, the game state shifts from the base game state to the bonus game state.

Figure 5:
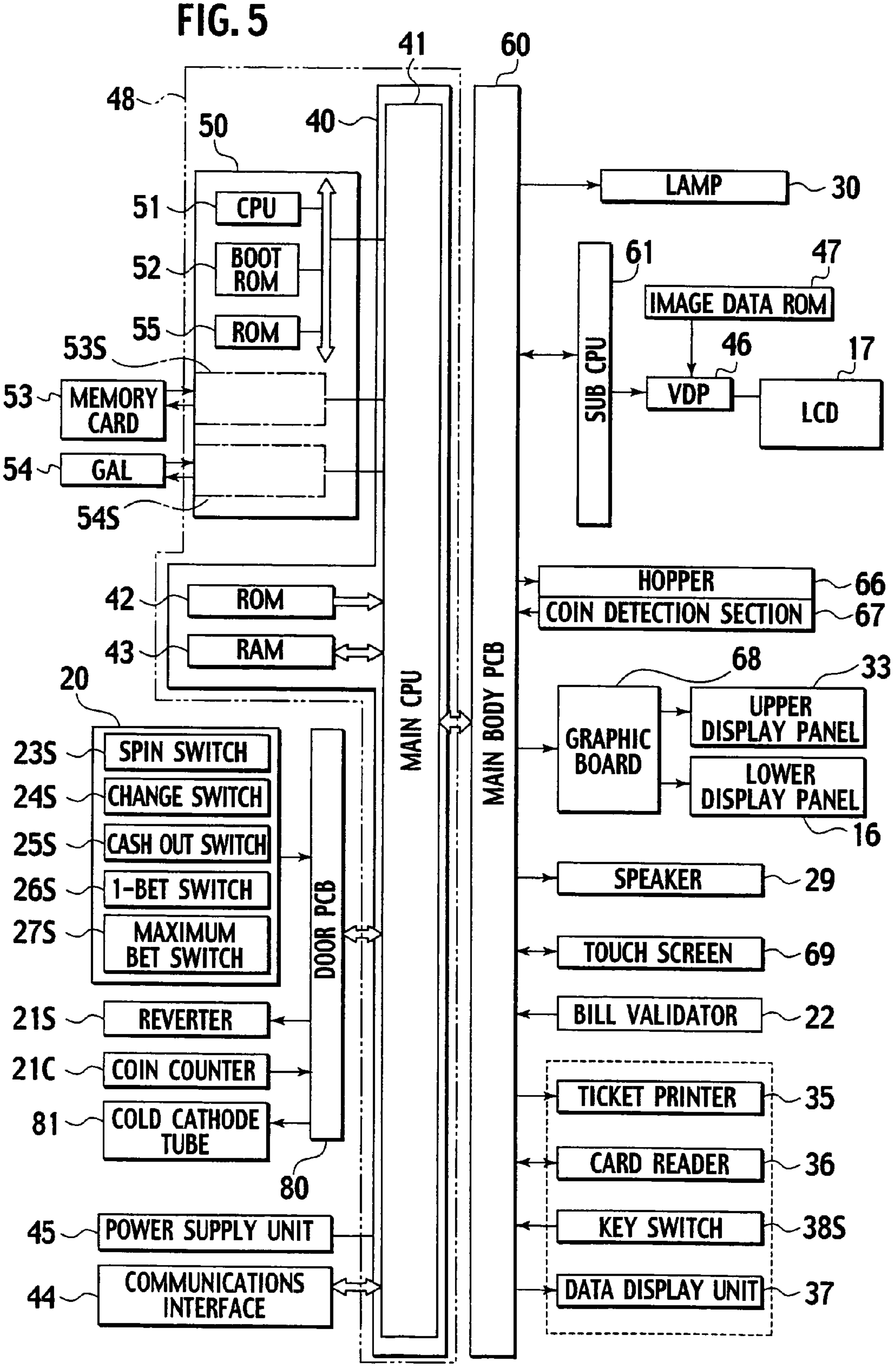
FIG. 5 is a block diagram illustrating a control circuit of the slot machine according to the one embodiment of the present invention.

FIG. 5 is a block diagram illustrating a control circuit of the slot machine 10 shown in FIG. 2. As shown in FIG. 5, the control circuit comprises a motherboard 40, a main body PCB (Printed Circuit Board) 60, a gaming board 50, a sub CPU 61, a door PCB 80, and various types of components such as switches or sensors. The motherboard 40 and the gaming board 50 constitute a controller 48.

The gaming board 50 comprises a CPU (Central Processing Unit) 51, a ROM 55 and a boot ROM 52, which are connected to each other by an internal bus, a card slot 53S corresponding to a memory card 53, and an IC socket 54S corresponding to a GAL (Generic Array Logic) 54.

The Memory card 53 stores game programs and game system programs. The game programs include a stop symbol determination program. The stop symbol determination program is a program for determining the symbol (code number corresponding to the symbol) to be stopped on the payline L of each of the display areas 28 (28*a* to 28*e*). The stop symbol determination program includes symbol weighting data corresponding to each of a plurality of kinds of payout rates (e.g., 80%, 84%, and 88%). The symbol weighting data indicates the relation between the code numbers (see FIG. 3) of respective symbols and one or more random number values within a predetermined numerical range (0 to 255), respectively for the five columns of the display areas 28 (28*a* to 28*e*).

The payout rate is defined based on the payout rate setting data that is output from the GAL 54. Based on the symbol weighting data corresponding to the payout rate, the symbols to be stopped are determined.

In addition, the card slot 53S, configured so as to be capable of inserting therein and removing therefrom the memory card 53, is connected to the motherboard 40 by the IDE bus. Thus, the type or content of the game to be executed on the slot machine 10 can be changed by removing the memory card 53 from the card slot 53S, writing another game program and game system program in the memory card 53, and inserting the memory card 53 into the card slot 53S.

The game programs include a program relating to the progress of the game and a program for shifting the state to the bonus game. In addition, the game programs include image data and sound data to be output during the game.

The GAL 54 comprises a plurality of input ports and output ports and, when data is entered in the input port, outputs data corresponding to the entered data from the output port. The data output from the output port is the payout rate setting data mentioned above.

In addition, the IC socket 54S, configured so as to be capable of attaching thereto and removing therefrom the GAL 54, is connected to the motherboard 40 by the PCI bus. Thus, the payout rate setting data to be output from the GAL 54 can be changed by removing the GAL 54 from the IC socket 54S, rewriting the program to be stored in the GAL 54, and attaching the GAL 54 to the IC socket 54S.

The CPU 51, the ROM 55 and the boot ROM 52 connected to each other by an internal bus are connected to the motherboard 40 by the PCI bus. The PCI bus transmits signals between the motherboard 40 and the gaming board 50, as well as supplying power from the motherboard 40 to the gaming board 50. The ROM 55 stores country identification information and a authentication program. The boot ROM 52 stores a preliminary authentication program and a program (boot code) by which the CPU 51 starts the preliminary authentication program.

The authentication program is a program for authenticating the game program and the game system program (falsifying check program). The authentication program is a program for checking and proving that the game program and the game system program have not been falsified. In other words, the authentication program is written in accordance with the procedure of authenticating the game program and the game system program. The preliminary authentication program is a program for authenticating the authentication program described above. The preliminary authentication program is written in accordance with the procedure of authenticating the authentication program, that is, to prove that the authentication program supposed to execute the authentication processing has not been falsified.

The motherboard 40 comprises a main CPU 41, a ROM (Read Only Memory) 42, a RAM (Random Access Memory) 43, and a communications interface 44.

The main CPU 41 controls, when credits have been bet and the spin button 23 is pressed, outputting a command signal to cause the sub CPU 61 to scroll the symbols on each of the display areas 28 (28*a* to 28*e*) of the LCD 17, determining the symbols to be stopped at a position on the middle portion (on the payline L) after the symbols on each of the display areas 28 (28*a* to 28*e*) have been started scrolling, and displaying the symbols in such a manner that the determined symbols stop on the payline L.

The ROM 42 stores programs such as the BIOS (Basic Input/Output System) executed by the main CPU 41 and also stores data to be used permanently. When the BIOS is executed by the main CPU 41, an initialization process of each peripheral unit is executed and a read process for reading the game program and the game system program stored in the memory card 53 via the gaming board 50 is started.

The RAM 43 stores data and programs used when the main CPU 41 executes the processes.

The communications interface 44 is for performing communication with the host computer and the like installed in the gaming facility via a communication network.

In addition, the main body PCB (Printed Circuit Board) 60 and the door PCB 80, which will be described below, are connected to the motherboard 40 by a USB (Universal Serial Bus), respectively. Furthermore, a power unit 45 is connected to the motherboard 40. When electric power is supplied to the motherboard 40 from the power unit 45, the main CPU 41 of the motherboard 40 is activated, and electric power is also supplied to the gaming board 50 via a PCI bus, activating the CPU 51.

Devices and units that generate input signals to be fed to the main CPU 41, as well as devices and units whose operation is controlled by control signals output from the main CPU 41 are connected to the main body PCB 60 and the door PCB 80. The main CPU 41 executes arithmetic processes and stores their result in the RAM 43, or transmits control signals to respective devices and units as control processes for the respective devices and units, by executing the game programs and the game system program stored in the RAM 43, based on input signals fed to the main CPU 41.

To the main body PCB 60 are connected: the sub CPU 61, a hopper 66, a coin detecting unit 67, a graphic board 68, the loudspeaker 29, a touch screen 69, the bill validator 22, the ticket printer 35, the card reader 36, a key switch 38S, and the data display unit 37.

The sub CPU 61 controls the scrolling of the symbols on the three columns of the display areas 28 (28*a* to 28*e*) set on the LCD 17, and is connected to a VDP (Video Display Processor) 46.

The VDP 46 reads out the image data of symbols stored in an image data ROM 47, generates scroll images to be displayed on the LCD 17, and outputs the scroll images to the LCD 17.

The hopper 66 is provided inside the cabinet 11 and pays out a predetermined number of coins from a coin payout opening 19 to the coin tray 18 based on control signals output from the main CPU 41. The coin detecting unit 67 is provided inside the coin payout opening 19 and outputs the input signal to the main CPU 41 if it has detected that a predetermined number of coins have been paid out from the coin payout opening 19.

The graphic board 68 controls display of images in the upper display panel 33 and lower display panel 16 except the symbols to be displayed on the display area 28, based on control signals output from the main CPU 41. The number of credits stored in the RAM 43 is displayed on the number-of-credits display unit 31 of the lower display panel 16. In addition, the number of coins paid out is displayed on the payout number display unit 32 of the lower display panel 16. In addition, the graphic board 68 comprises a VDP for generating image data based on control signals output from the main CPU 41, a video RAM for temporarily storing the image data generated by the VDP, and the like.

The bill validator 22 reads the images of the bills to accept legitimate bills into the cabinet 11. In addition, upon accepting a legitimate bill, the bill validator 22 outputs an input signal to the main CPU 41 according to the value of the bill. The main CPU 41 stores, in the RAM 43, a number of credits corresponding to the value of the bill, the value having been transmitted by the input signal.

The ticket printer 35 prints, based on control signals output from the main CPU 41, bar codes on the ticket expressing coded data such as number of credits stored in the RAM 43, time and date, identification number of the slot machine 10, or the like, and outputs the ticket as the bar-coded ticket 39.

The card reader 36 reads data from the smart card and transmits the data to the main CPU 41, or writes data into the smart card based on control signals from the main CPU 41. The key switch 38S is provided on the key pad 38 and outputs, when the key pad 38 is operated by the player, the entered signal to the main CPU 41.

On the data display unit 37, the data read by the card reader 36 or the data entered via the key pad 38 by the player is displayed based on control signals output from the main CPU 41.

The control panel 20, a reverter 21S, a coin counter 21C, and a cold cathode tube 81 are connected to the door PCB 80. On the control panel 20, a spin switch 23S corresponding to the spin button 23, a change switch 24S corresponding to the change button 24, a cash out switch 25S corresponding to the cash out button 25, a 1-bet switch 26S corresponding to the 1-bet button 26, and a maximum bet switch 27S corresponding to the maximum bet button 27 are provided. The respective switches 23S to 27S output, when their corresponding buttons 23 to 27 are operated by the player, the input signals to the main CPU 41.

The coin counter 21C is provided inside the coin insertion slot 21 and discriminates whether or not the coin inserted into the coin insertion slot 21 by the player is legitimate. Coins other than legitimate ones are ejected from the coin payout opening 19. In addition, upon detecting a legitimate coin, the coin counter 21C outputs the input signal to the main CPU 41.

The reverter 21S operates based on control signals output from the main CPU 41 to sort out the coins recognized as legitimate coins by the coin counter 21C to either the cashbox (not shown) or the hopper 66 provided inside the slot machine 10. In other words, when the hopper 66 is filled with coins, legitimate coins are sorted out to the cashbox by the reverter 21S. On the other hand, when the hopper 66 is not filled with coins, legitimate coins will be sorted out to the hopper 66.

The cold cathode tube 81 functions as a back light provided in the lower display panel 16 and the back side of the upper display panel 33, and lights up based on control signals output from the main CPU 41.

Figure 6:
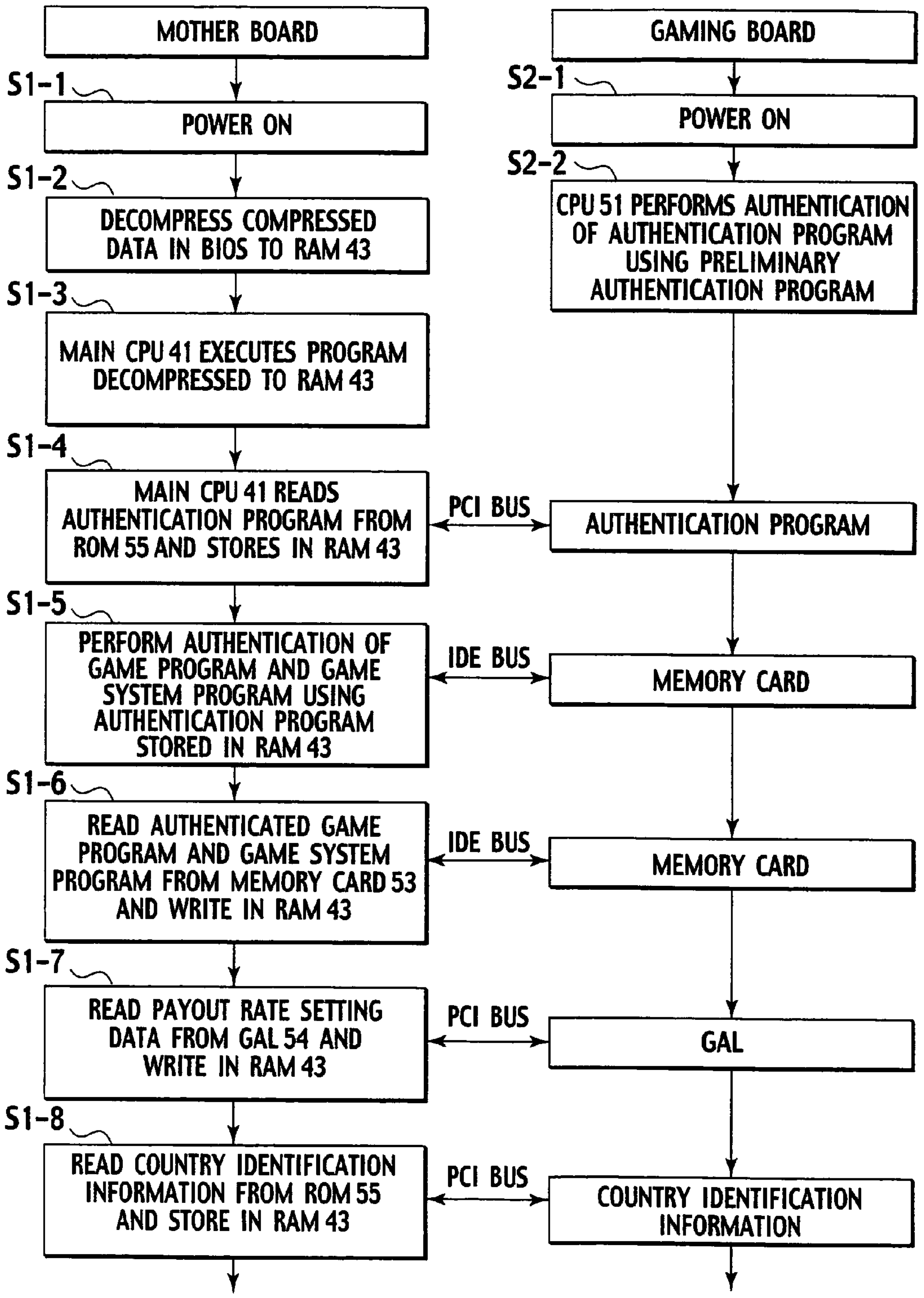
FIG. 6 is a flow chart illustrating the procedure of authentication reading process of a game program and a game system program executed by a motherboard and a gaming board of the slot machine according to the one embodiment of the present invention.

Next, a specific process executed in the slot machine 10 will be described. FIG. 6 is a flow chart illustrating the procedure (process in step S100 shown in FIG. 1) of the authentication reading process of the game program and the game system program executed by the motherboard 40 and the gaming board 50 shown in FIG. 5. Here, it is assumed that the memory card 53 is attached to the card slot 53S on the gaming board 50, and the GAL 54 is attached to the IC socket 54S.

First, upon switching on the power switch in the power unit 45, the motherboard 40 and the gaming board 50 are activated (steps S1-1 and S2-1). When the motherboard 40 and the gaming board 50 are activated, separate processes are executed in parallel. In other words, in the gaming board 50, the CPU 51 reads out the preliminary authentication program stored in the boot ROM 52 and executes a preliminary authentication in accordance with the read-out preliminary authentication program to check and prove, before taking into the motherboard 40, that the authentication program has not been falsified (step S2-2).

On the other hand, in the motherboard 40, the main CPU 41 executes the BIOS stored in the ROM 42 and expands the compressed data embedded in the BIOS into the RAM 43 (step S1-2). Then the main CPU 41 executes the BIOS that has been expanded into the RAM 43 and executes diagnosis and initialization of various peripheral units (step S1-3).

Then, since the ROM 55 of the gaming board 50 is connected to the main CPU 41 via the PCI bus, the main CPU 41 reads out the authentication program stored in the ROM 55. Furthermore, the main CPU 41 executes a process to store the read-out authentication program in the RAM 43 (step S1-4).

Next, the main CPU 41 accesses the memory card 53 attached to the card slot 53S via the IDE bus. Then, the main CPU 41 reads out the game program and the game system program stored in the memory card 53.

Next, the main CPU 41 executes authentication to check and prove, in accordance with the authentication program stored in the RAM 43, that the read-out game program and the game system program have not been falsified (step S1-5).

If the authentication processing is completed normally, the main CPU 41 stores the authenticated game program and game system program into the RAM 43 (step S1-6). Next, the main CPU 41 accesses the GAL 54 attached to the IC socket 54S via the PCI bus, and reads the payout rate setting data from GAL 54 and stores it into the RAM 43 (step S1-7). Next, the main CPU 41 reads the country identification information stored in the ROM 55 of the gaming board 50 via the PCI bus, and stores the read-out country identification information in the RAM 43 (step S1-8).

After executing the above-mentioned process, the main CPU 41 makes the base game progress as described below, by sequentially reading out and executing the game program and the game system program.

Figure 7:
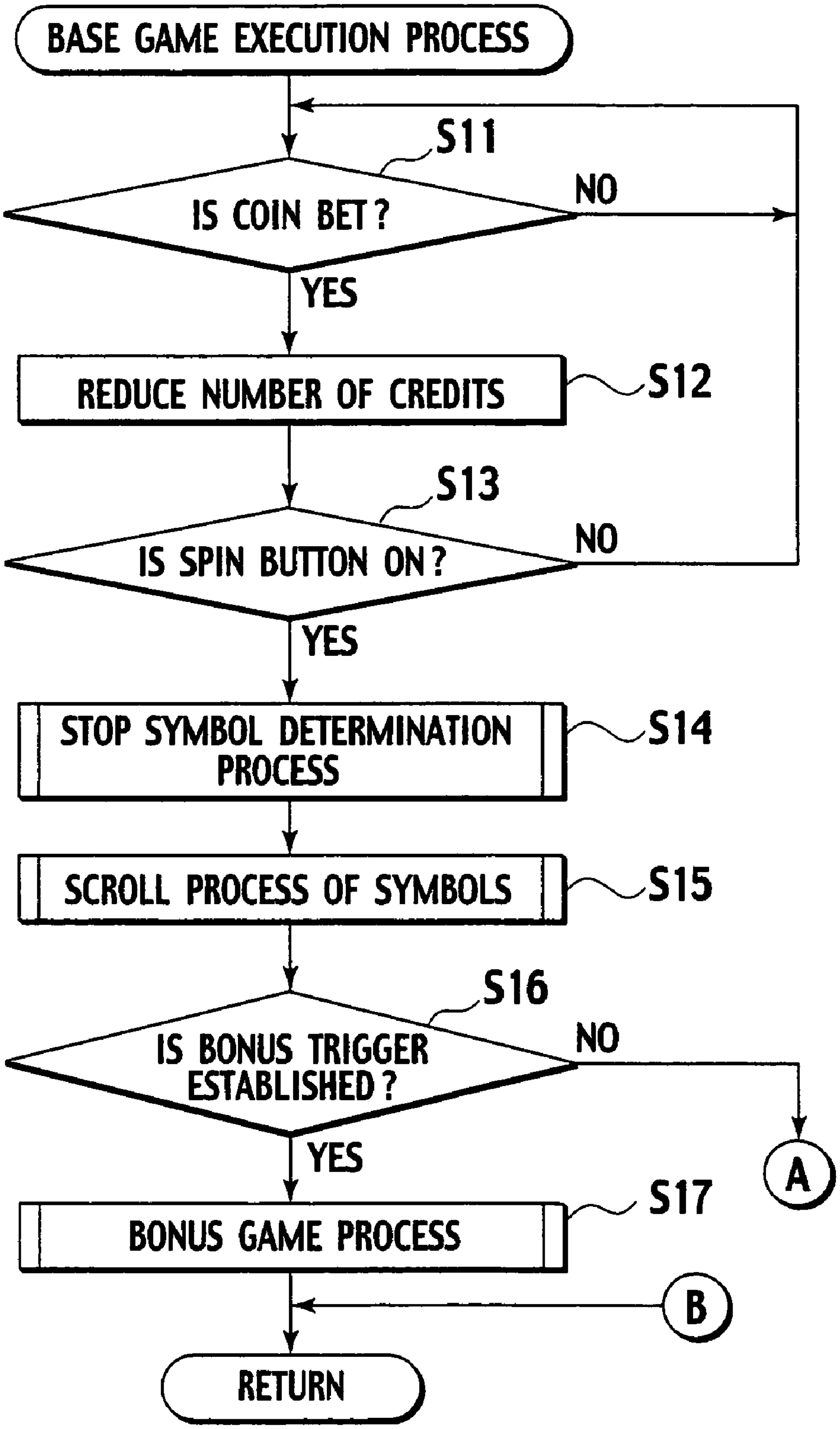
FIG. 7 is a flow chart illustrating a part of the procedure of a base game executed by the slot machine according to the one embodiment of the present invention.

After the authentication reading process shown in FIG. 6 has been executed, the main CPU 41 starts the execution process of the base game. FIG. 7 is a flow chart illustrating a specific process sequence of execution process of the base game shown in step S200 in FIG. 1.

In the base game execution process, the main CPU 41 first determines whether or not a coin has been bet (step S11). In this process, the main CPU 41 determines whether or not an input signal that is output from the 1-bet switch 26S when the 1-bet button 26 is pressed, or an input signal that is output from the maximum bet switch 27S when the maximum bet button 27 is pressed is accepted. If it is determined that no coin has been bet, the process returns to step S11.

On the other hand, if it is determined in step S11 that coins have been bet, the main CPU 41 executes a process to subtract the number of credits stored in the RAM 43 according to the number of coins bet (step S12). Here, if the number of coins bet is larger than that of credits stored in the RAM 43, the process returns to step S11 without subtracting the number of credits stored in the RAM 43. In addition, if the number of coins bet exceeds an upper limit (50 in the present embodiment) that can be bet for a single game, the process proceeds to step S13 without subtracting the number of credits stored in the RAM 43. In this condition, the symbols can be scrolled on the display areas 28 (28*a* to 28*e*).

Next, the main CPU 41 determines whether or not the spin button 23 is turned on (step S13). In this process, when the spin button 23 is turned on, the main CPU 41 determines whether or not an input signal that is output from the spin switch 23S is accepted. If it is determined that the spin button 23 has not been turned on, the process returns to step S11. Here, the main CPU 41 cancels the subtraction result in step S12 if the spin button 23 is not turned on (for example, a command to finish the game has been input without turning on the spin button 23).

In the present embodiment, a case will be described in which a process of subtracting the number of credits (step S12) is executed after the coins have been bet (step S11) and before determining whether or not the spin button 23 has been turned on (step S13). However, the present invention is not limited to this case. For example, whether or not the spin button 23 has been turned on is determined (step S13) after the coins have been bet (step S11). The process of subtracting the number of credits (step S12) may be executed if it is determined that the spin button 23 has been turned on (YES in step S13).

Then the main CPU 41 executes a process of determining the symbols to be stopped (step S14) if it is determined that the spin button 23 has been turned on in step S13 in FIG. 7. In this process of determining the symbols to be stopped, the main CPU 41 determines, by executing a stop symbol determination program stored in the RAM 43, the symbols to be displayed through the display windows 15 when the symbols come to a stop on each of the display areas 28 (28*a* to 28*e*). This determines the combination of the symbols that will stop on the payline L.

Next, the main CPU 41 executes a process of scrolling the symbols (step S15). This is a process that stops, after scrolling of the symbols on each of the display areas 28 (28*a* to 28*e*) has been started, the symbols on each of the display areas 28 (28*a* to 28*e*) so that the symbols determined in step S14 will stop on the payline L.

Figure 13A:
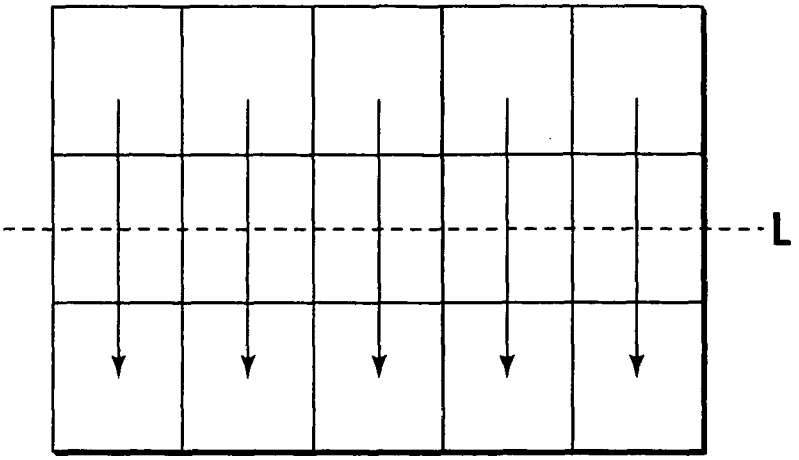
FIG. 13A is a diagram illustrating a display example when scrolling symbols.
Figure 13B:
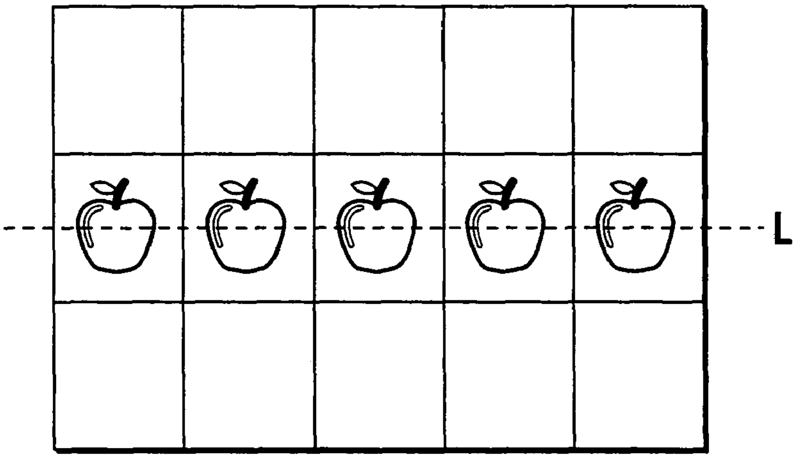
FIG. 13B is a diagram illustrating a display example when the winning combination of the symbols of the "APPLE" is rearranged on the payline.

Next, the main CPU 41 determines whether or not the bonus trigger has been achieved, that is, whether or not the combination of the "APPLE" as shown in FIG. 13B, for example, has come to a stop on the payline L (step S16). When it is determined that the bonus trigger has been achieved, the bonus game to be described later is executed (step S17).

Figure 8:
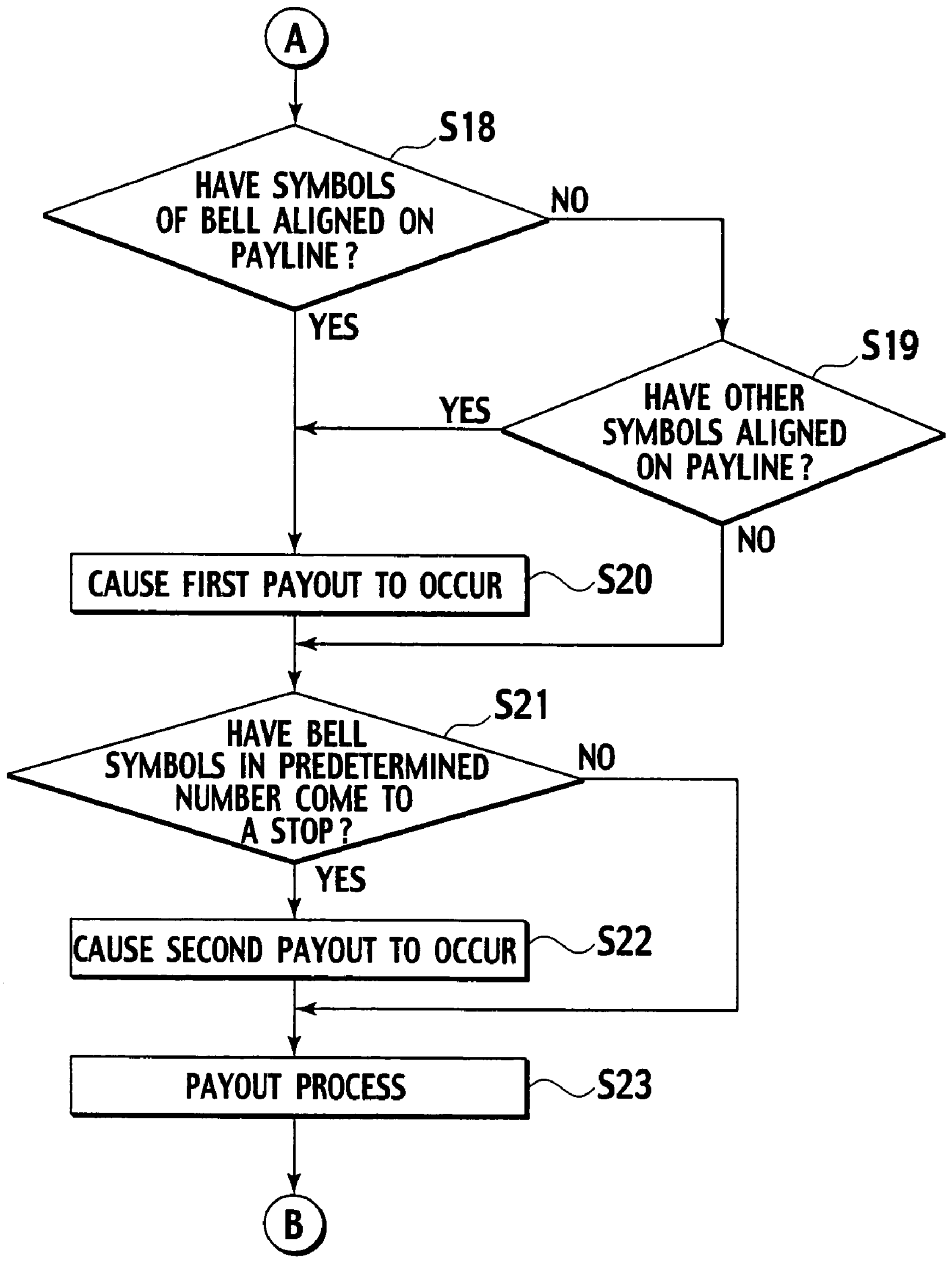
FIG. 8 is a flow chart illustrating another part of the procedure of the base game executed by the slot machine according to the one embodiment of the present invention.
Figure 13C:
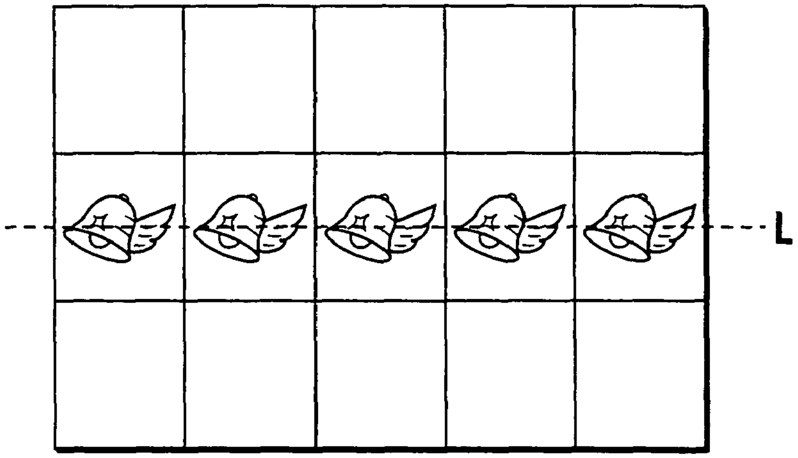
FIG. 13C is a diagram illustrating a display example when the winning combination of the specific symbols of the "BELL" is rearranged on the payline.

On the contrary, when the bonus trigger has not been achieved, the main CPU 41 determines whether or not the winning combination of the "BELL" as shown in FIG. 13C has come to a stop on the payline L as shown in the flow chart in FIG. 8 (step S18). When it is determined that the winning combination of the "BELL" has come to a stop on the payline L, the first payout in accordance with the winning combination of the "BELL" is caused to occur (step S20).

When it is determined that the winning combination of the "BELL" has not come to a stop on the payline L (NO in step S18), the main CPU 41 determines whether or not a winning combination of the "CHERRY" or "PLUM", other than "BELL", specified in the table in FIG. 4 has come to a stop on the payline L (step S19). When it is determined that a winning combination of symbols other than the "BELL" has come to a stop on the payline L, the first payout in accordance with the winning combination that has come to a stop on the payline L is caused to occur (step S20).

When it is determined that any one of the winning combinations of the "BELL", "CHERRY", and the "PLUM" has not come to a stop on the payline L (NO in step S18, NO in step S19), or when the first payout in accordance with the winning combination of the "BELL", "CHERRY", or "PLUM" that has come to a stop on the payline L is caused to occur in step S20, the main CPU 41 determines whether or not six (predetermined number) of the symbol of the "BELL" have come to a stop on the display areas 28 (28*a* to 28*e*) (step S21).

When it is determined that six of the symbol of the "BELL" have come to a stop on the display areas 28 (28*a* to 28*e*), the main CPU 41 causes the second payout in accordance with the six "BELL" symbols to occur (step S22).

Figure 14A:
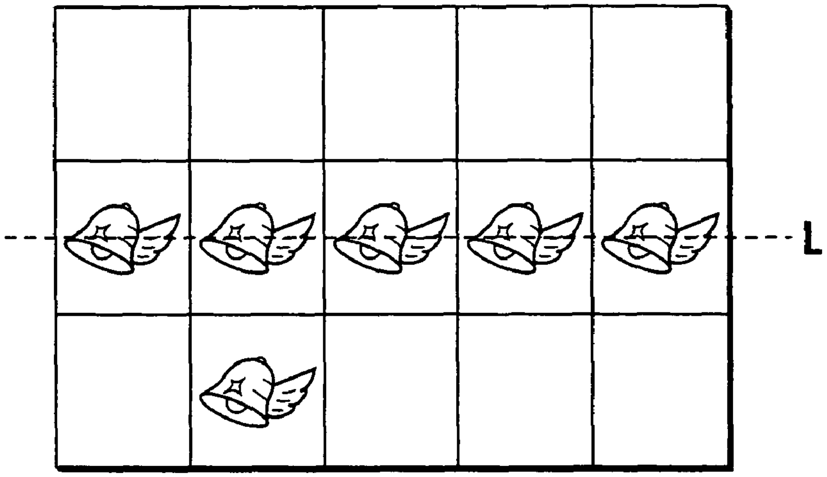
FIG. 14A is a diagram illustrating a display example when the winning combination of the specific symbols of the "BELL" is rearranged on the payline and the specific symbols of the "BELL" in a predetermined number are rearranged.

Then, the main CPU 41 performs the total payout process of the first payout and the second payout that have been caused to occur in the step 20 and step S22 (step S23). For example, as shown in FIG. 14A, when the winning combination of the "BELL" has been achieved on the payline L and further six, which is the predetermined number, of the "BELL" symbol are displayed, both the first payout and the second payout are caused to occur and the total of both payouts is paid out.

Figure 14B:
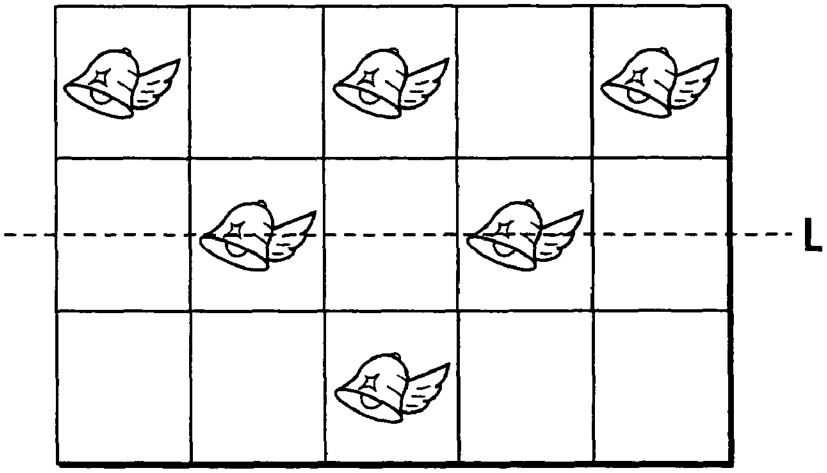
FIG. 14B is a diagram illustrating a display example when the winning combination of the specific symbols of the "BELL" is not rearranged on the payline but the specific symbols of the "BELL" in a predetermined number are rearranged.

Further, as shown in FIG. 14B, when the winning combination of the "BELL" has not been achieved on the payline L and six, the predetermined number, of the "BELL" symbol are displayed on each of the display areas 28, only the second payout is caused to occur and the payout process is performed in step S13.

Incidentally, when it is determined that any one of the winning combinations of the "BELL", "CHERRY", and "PLUM" has not come to a stop on the payline L (NO in step S18, NO in step S19) and it is determined that six of the "BELL" symbol have not come to a stop on the display areas 28 (28*a* to 28*e*) (NO in step S21), the payout process of coins by the main CPU 41 is not performed. In this manner, the base game is executed.

When saving the coins to be paid out, the main CPU 41 adds a predetermined number of credits to the number of credits stored in the RAM 43. In addition, when paying out coins, the main CPU 41 transmits a control signal to the hopper 66 to pay out a predetermined number of coins. In this circumstance, the coin detecting unit 67 counts the number of coins to be paid out from the hopper 66, and transmits a payout completion signal to the main CPU 41 when the counted value reaches a specified number. This causes the main CPU 41 to stop the operation of the hopper 66, and complete the coin payout process.

Therefore, even if any one of the winning combinations of the "BELL", "CHERRY", and "PLUM" has not come to a stop on the payline L, the player can receive payout when the symbols of the "BELL" in a predetermined number (for example, six) come to a stop on the display areas 28 (28*a* to 28*e*), therefore, the player can get a larger amount of payout.

Next, a process for determining the symbols to be stopped that is shown in step S14 in FIG. 7 will be described, referring to the flow chart shown in FIG. 9.

Figure 9:
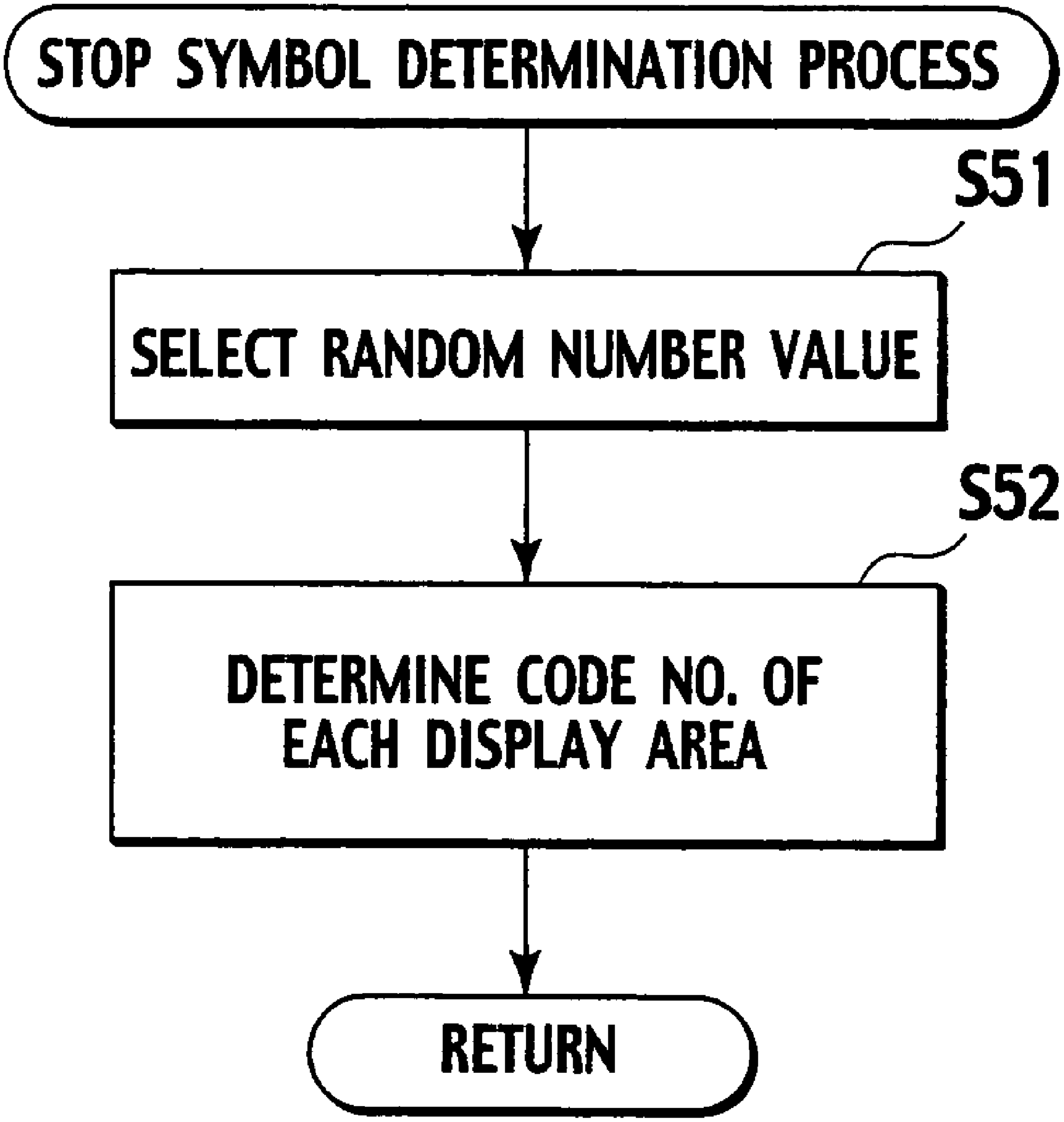
FIG. 9 is a flow chart illustrating the procedure of a stop symbol determination process, which is executed by the slot machine according to the one embodiment of the present invention.

FIG. 9 is a flow chart illustrating the procedure of a process of determining the symbols to be stopped, which is shown in step S14 in FIG. 7. The process is executed by the main CPU 41 executing the stop symbol determination program stored in the RAM 43.

First, the main CPU 41 selects random number values corresponding to each of the columns of the display areas 28 (28*a* to 28*e*) out of a numeral range of 0 to 255 by executing a random number generation program included in the stop symbol determination program (step S51).

Next, the main CPU 41 refers to symbol weighting data corresponding to the payout rate setting data that is output from the GAL 54 and stored in the RAM 43 and determines (step S52), based on the five selected random number values, code numbers (see FIG. 3) for each of the display areas 28 (28*a* to 28*e*).

The code numbers for each of the display areas 28 (28*a* to 28*e*) correspond to the code numbers of the symbols to be stopped on the payline L. The main CPU 41 determines a winning combination by determining the code numbers for each of the display areas 28. For example, if the code numbers for each of the display areas 28 (28*a* to 28*e*) are determined as "00", "00", "00", "00", and "00", respectively, it follows that the main CPU 41 has determined the winning combination as "JACKPOT 7".

Figure 10:
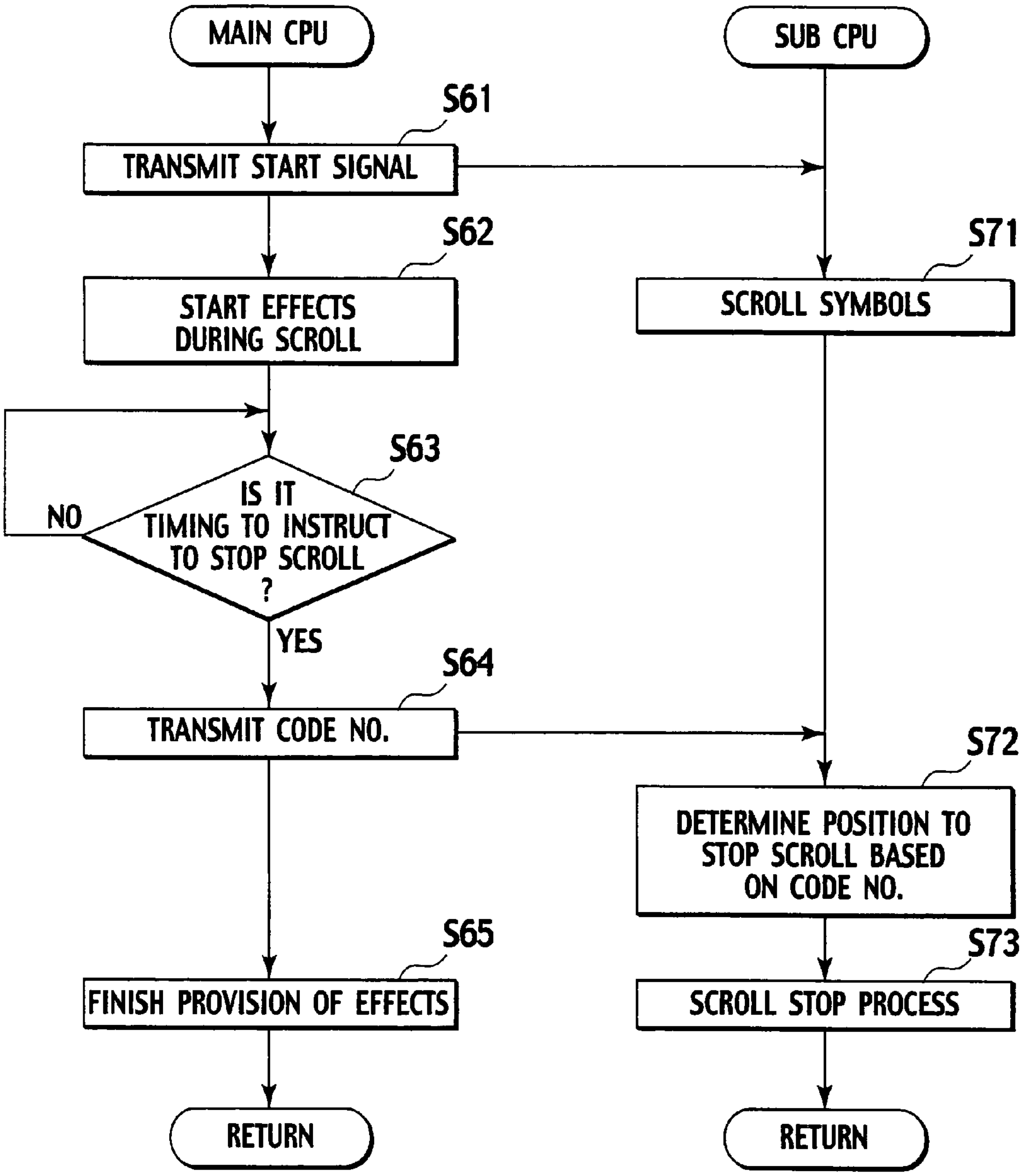
FIG. 10 is a flow chart illustrating the procedure of a scroll process of symbols executed by the slot machine according to the one embodiment of the present invention.

FIG. 10 is a flow chart illustrating the process of scrolling the symbols shown in step S15 in FIG. 7. Here, the process is one executed between the main CPU 41 and the sub CPU 61.

First, the main CPU 41 transmits, to the sub CPU 61, a start signal to start scroll of symbols on the display areas 28 of the LCD 17 (step S61). Upon accepting the start signal from the main CPU 41, the sub CPU 61 outputs, to the VDP 46, a scroll command of the symbols. The VDP 46 reads image data of the symbols stored in the image data ROM 47, and scrolls the symbols on the five columns of the display areas 28 (28*a* to 28*e*) of the LCD 17 (step S71), whereby scrolling of the symbols is started in each of the three columns of the display areas 28 (28*a* to 28*e*).

After having transmitted the start signal to the sub CPU 61 in step S61 shown in FIG. 10, the main CPU 41 provides effects while the symbols are being scrolled (step S62). The process is a process that displays images to the lower display panel 16 or outputs sound from the loudspeaker 29 for a period (e.g., three seconds) defined by the result of determination process of the symbols to be stopped (step S14 of FIG. 7).

Next, the main CPU 41 determines whether or not it is a proper timing to instruct to stop the scrolling (step S63 of FIG. 10).

If, in the process of step S63, it is determined that it is not a proper timing to instruct to stop the scrolling, the process returns to step S63 and continues to provide effects during the scrolling. Otherwise, if, in the process of step S63, it is determined that it is a proper timing to instruct to stop the scrolling, the Main CPU 41 transmits the code number of the symbol stored in the RAM 43 to the sub CPU 61 (step S64). Upon accepting the code number of the symbol from the main CPU 41, the sub CPU 61 determines the position to stop the scrolling so as to correspond to the code number (step S72).

Subsequently, a process to stop the scrolling is executed, whereby the symbols are stopped and displayed (step S73) on each of the display areas 28 (28*a* to 28*e*) inside the display window 15. In addition, the process of displaying effect images by the main CPU 41 is completed (step S65).

Figure 11:
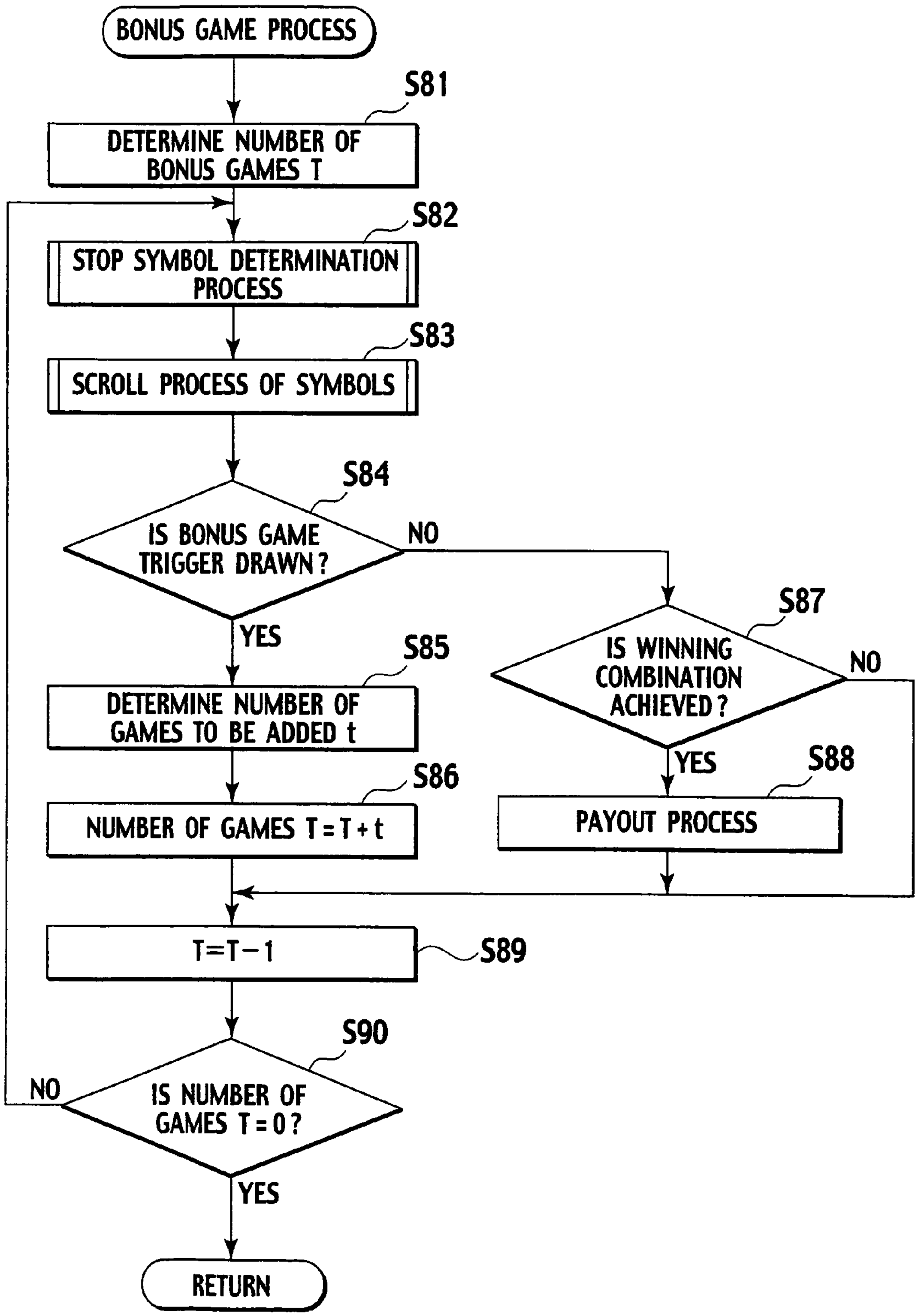
FIG. 11 is a flow chart illustrating the process sequence of a bonus game executed by the slot machine according to the one embodiment of the present invention.

FIG. 11 is a flow chart illustrating the bonus game process shown in step S17 in FIG. 7. In the bonus game process, the main CPU 41 first executes a random number generation program included in the stop symbol determination program stored in the RAM 43. The main CPU 41 determines the number of execution times T of the bonus game from 10 to 25 games based on the obtained random number value (step S81). The main CPU 41 stores data of the determined number of games T of the bonus game in the RAM 43.

Next, the main CPU 41 executes a process of determining the symbols to be stopped (step S82) and a process of scrolling the symbols (step S83). The process of step S82 is generally similar to the process explained using FIG. 9. Likewise, the process of step S83 is generally similar to the process explained using FIG. 10. Since these processes have already been described, duplicate description will be omitted here.

Next, as shown in FIG. 11, the main CPU 41 determines whether or not the bonus game trigger has been achieved, i.e., the combination of the "APPLE" has come to a stop on the payline L on the display areas 28 (28*a* to 28*e*) inside the display window 15 (step S84). If it is determined that the bonus game trigger has been achieved (YES in step S84), the number of repetition times t of the bonus game is newly determined (step S85). The determined number of repetition times t is added to the game number T of the current bonus game (step S86), whereby the remaining number of times of the bonus game increases if the bonus game is won again during execution of the bonus game.

If the bonus game trigger has not been achieved, the main CPU 41 determines whether or not the winning combination of the "BELL", "CHERRY", or "PLUM" is achieved on the payline L (step S87). If it is determined that the winning combination of the "BELL", "CHERRY", or "PLUM" has been achieved on the payline L (YES in step S87), the main CPU 41 executes payout of coins according to the number of coins inserted and the winning combination (step S88). In this event, payout is made based on the payout table shown in FIG. 4.

When the process of step S86 or S88 is executed, or if it is determined in step S87 that none of the winning combinations of the "BELL", "CHERRY", and "PLUM" is achieved on the payline L (determined to be losing), the main CPU 41 reads out the game number T of the bonus game stored in the RAM 43 and subtracts a value 1 from the read-out game number T. Then, the game number T after subtraction is stored in the RAM 43 again (step S89).

Subsequently, the main CPU 41 determines whether or not the game number T of the bonus game has reached the number of times determined in step S81 (step S90). Specifically, the determination is made based on whether or not the game number T stored in the RAM 43 has become zero. If the game number T is not zero, in other words, if it is determined that the number of execution times of the bonus game has not reached the number of times determined in step S81, the process returns to step S82 and the above process is repeated.

On the other hand, if the game number T is zero, in other words, if it is determined that the number of execution times of the bonus game has reached the number of times determined in step S81, the process is completed. The bonus game is executed in this manner.

By the way, in the present embodiment, an example is explained, in which when the bonus game trigger has not been achieved (NO in step S84 in FIG. 11) and any one of the winning combinations of the "BELL", "CHERRY", and "CHERRY" has not been achieved on the payline L (NO in step S87) in the bonus game process, the main CPU 41 does not execute the payout process of coins. However, the present invention is not limited to this and it may also be possible for the main CPU 41 to execute the payout process when six (as a predetermined number) symbols of the "BELL" come to a stop on the display area 28 (28*a* to 28*e*) even if the bonus game trigger has not been achieved and none of the winning combinations of the "BELL", "CHERRY", and "PLUM" has been achieved.

A modification example of the bonus game process based on the above contents will be explained below with reference to the flow chart in FIG. 12.

Figure 12:
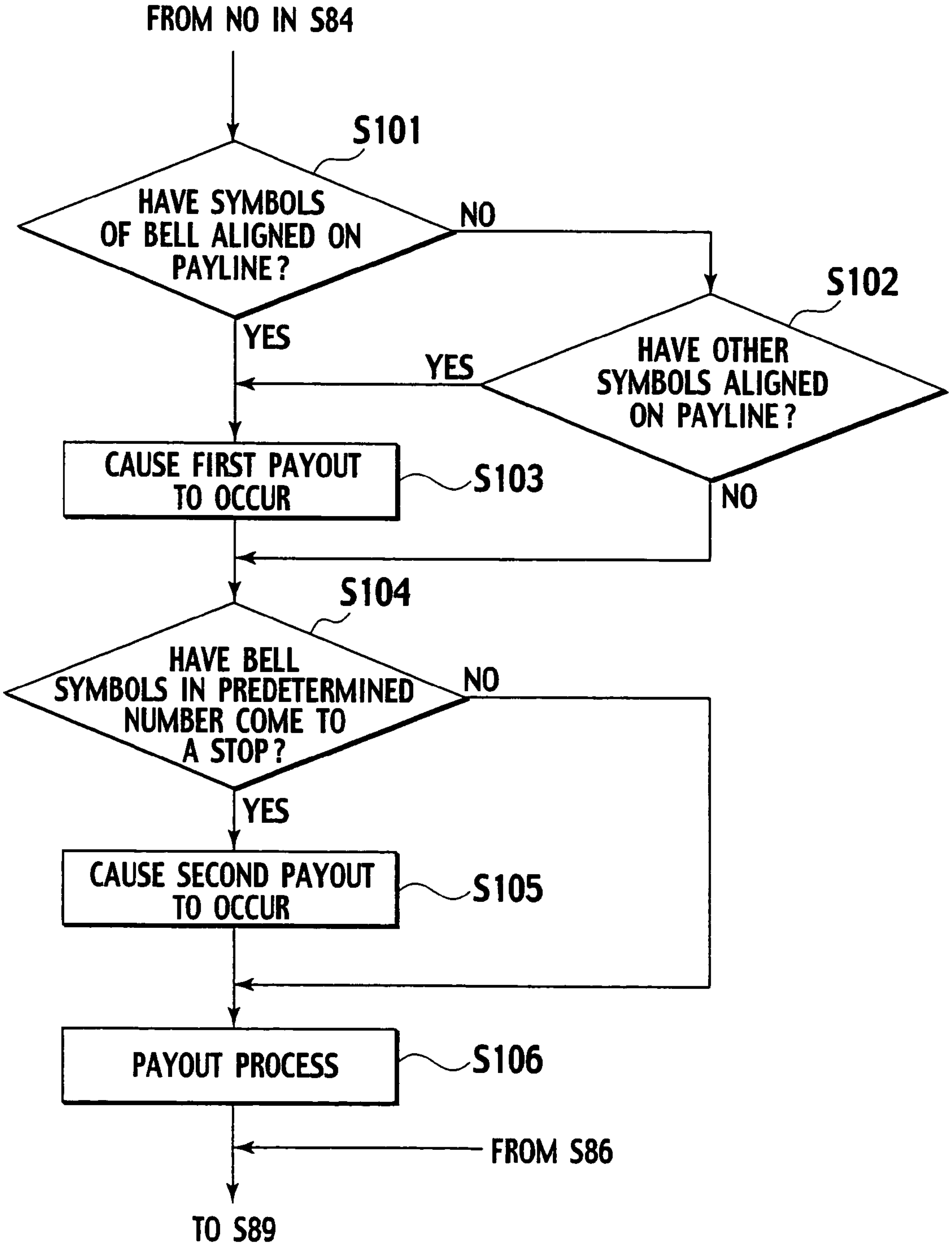
FIG. 12 is a flow chart illustrating the process sequence according to a modification example of the bonus game executed by the slot machine according to the one embodiment of the present invention.

FIG. 12 is the flow chart illustrating a part of the process sequence according to a modification example of the bonus game executed by the slot machine according to one embodiment of the present invention. When it is determined that the bonus game trigger is not achieved in step S84 shown in FIG. 11, the main CPU 41 determines whether or not the winning combination of the "BELL" as shown in FIG. 13C has come to a stop on the payline L (step S101). When it is determined that the winning combination of the "BELL" has come to a stop on the payline L (YES in step S101), the main CPU 41 causes the first payout in accordance with the winning combination of the "BELL" (step S103).

When it is determined that the winning combination of the "BELL" has not come to a stop in the process in step S101 (NO in step S101), the main CPU 41 determines whether or not a winning combination of the "CHERRY" or "PLUM", other than the "BELL", specified in the table in FIG. 4, has come to a stop on the payline L (step S102). When it is determined that a winning combination of symbols other than the "BELL" has come to a stop on the payline L, the first payout is caused to occur in accordance with the winning combination that has come to a stop on the payline L (step S103).

When it is determined that any one of the winning combinations of the "BELL", "CHERRY", and "PLUM" has not come to a stop on the payline L (NO in step S101, NO in step S102), or when the first payout is caused to occur in step S103 in accordance with the winning combination of the "BELL", "CHERRY", or "PLUM" that has come to a stop on the payline L, the main CPU 41 determines whether or not six, a predetermined number, of the "BELL" symbol have come to a stop on the display areas (28*a* to 28*e*) (step S104).

When it is determined that six of the "BELL" symbol have come to a stop on the display areas 28 (28*a* to 28*e*), the main CPU 41 causes the second payout to occur in accordance with the six symbols of the "BELL" (step S105).

Then, the main CPU 41 performs the total payout process of the first payout and the second payout that have been caused to occur in step S103 and step S105 (step S106).

Therefore, even if any one of the winning combinations of the "BELL", "CHERRY", and "PLUM" has not come to a stop on the payline L, the player can receive payout when the symbols of the "BELL" in a predetermined number (for example, six) come to a stop on the display areas 28 (28*a* to 28*e*), therefore, the player can get a larger amount of payout in the bonus game.

Incidentally, when it is determined that any one of the winning combinations of the "BELL", "CHERRY", and "PLUM" has not come to a stop on the payline L (NO in step S101, NO in step S102) and it is determined that six of the "BELL" symbol have not come to a stop on the display areas 28 (28*a* to 28*e*) (NO in step S104), the payout process of coins by the main CPU 41 is not performed.

Then, after having executed the payout process in step S106, the main CPU 41 executes the processes in step S89 and following steps shown in FIG. 11.

As described above, with the slot machine and the playing method according to the present embodiment, even when any one of the winning combinations of the "BELL", "CHERRY", and "PLUM" has not come to a stop on the payline L, the player can receive payout if six of the specific symbol, such as the "BELL", for example, have come to a stop on the display areas 28 (28*a* to 28*e*). Due to this, even if a winning combination is not achieved on the payline L, it is possible to cause the player to maintain concern and interest in the game and prevent the player from losing the concern and interest in the game.

Although embodiments of a slot machine according to the present invention have been described as above, they are for illustrative purpose only and not intended to limit the present invention, and in particular, the specific configuration of the respective units may be suitably changed in design. In addition, since the advantages described in the embodiments of the present invention only enumerate the most preferred advantages that rise from the present invention. The advantages of the present invention are not limited to those described in the embodiments of the present invention.

For example, in the present embodiment, even when it is determined by the main CPU 41 that the winning combination of the "BELL", "CHERRY", or "PLUM" has been achieved on the payline L and the first payout has been caused to occur, if it is determined that six of the "BELL" symbols have come to a stop on the display areas 28 (28*a* to 28*e*), the main CPU 41 adds the second payout in accordance therewith to the first payout and pays out the total payout.

However, it may also be possible for the main CPU 41 to cause the second payout, in the case where it is determined that six of the "BELL" symbol have come to a stop on the display areas 28 (28*a* to 28*e*), to occur only when it is determined that any one of the winning combinations of the "BELL", "CHERRY", and "PLUM" has not been achieved on the payline L and the first payout has not been caused to occur. It is also possible to design such that the main CPU 41 executes only one of the first payout and the second payout in the payout process in step S88 in FIG. 11 or in step S106 in FIG. 12. In this case, even if no winning combination is achieved on the payline L, the player can expect that the "BELL" symbols in a predetermined number may come to a stop, therefore, it is possible to prevent the player from losing concern and interest in the game.

Further, in the present embodiment, a case where the specific symbol is the "BELL", however, it may also be possible to assume the "STRAWBERRY", "PLUM", "ORANGE", "APPLE", "LOBSTER", or "CRAB" other than the "BELL" to be the specific symbol.

In this case, as to the "STRAWBERRY", "PLUM", "ORANGE", "APPLE", "LOBSTER", or "CRAB" other than the "BELL", it is also possible to cause the main CPU 41 to execute the payout process when it is determined that symbols in a predetermined number (for example, six) have come to a stop on the display areas 28 (28*a* to 28*e*).

Alternatively, it is also possible to cause the main CPU 41 to execute the payout process when it is determined that symbols in a predetermined number (for example, six) have come to a stop on the display areas 28 (28*a* to 28*e*), as to only one arbitrary symbol out of the "STRAWBERRY", "PLUM", "ORANGE", "APPLE", or "CRAB" other than the "BELL".

What is claimed is:

1. A slot machine comprising:

a display having a plurality of display areas for displaying symbols in a matrix format and a payline set across the plurality of display areas on which the symbols that have been arranged are rearranged; and a controller operable to provide a payout on at least one of (i) a first winning condition where a specific combination of the symbols appears on the payline and (ii) a second winning condition where a predetermined number of scatter symbols appears on the plurality of display areas, after the symbols are rearranged, wherein the controller is operable to provide the payout for the second winning condition only when the first winning condition is not met.

2. A slot machine comprising:

a display having a plurality of display areas for displaying symbols in a matrix format and a payline set across the plurality of display areas on which the symbols that have been arranged are rearranged; and a controller operable to provide a payout on at least one of (i) a first winning condition where a specific combination of the symbols appears on the payline and (ii) a second winning condition where a predetermined number of scatter symbols appears on the plurality of display areas, after the symbols are rearranged, wherein the controller is operable to provide a total payout for the first winning condition and the second winning condition when the first winning condition and the second winning condition are met concurrently.

3. A slot machine comprising:

a display having a plurality of display area for displaying symbols in a matrix format and a payline set across the plurality of display areas on which the symbols that have been arranged are rearranged in a unit; and a controller operable during the unit game to:

(a) provide a first payout for a first winning condition when a specific combination of the symbols appears on the payline, and (b) provide a second payout for a second winning condition when a predetermined number of scatter symbols appears on the plurality of display areas;

wherein the controller is operable to provide the second payout only when the first winning condition is not met and the second winning condition is met.

4. A slot machine comprising:

a display having a plurality of display areas for displaying symbols in a matrix format and a payline for a payout set across the plurality of display areas on which the symbols that have been arranged are rearranged in a unit game; and a controller operable during the unit game to:

(a) provide a first payout for a first wining condition when a specific combination of the symbols appears on the payline, and (b) provide a second payout for a second winning condition when a predetermined number of scatter symbols appears on the plurality of display areas;

wherein the controller is operable to provide a total payout for the first payout and the second payout when the first winning condition and the second winning condition are met concurrently.

5. A slot machine comprising:

a display having a plurality of display areas for displaying symbols in a matrix format and a payline set across the plurality of display areas; and a controller operable to:

(a) execute a rearrangement control to rearrange symbols determined arbitrarily among a plurality of kinds of symbols on the plurality of display areas after scrolling the symbols; and (b) provide a payout on at least one of (i) a first winning condition where a specific combination of the symbols appears on the payline and (ii) a second winning condition where a predetermined number of scatter symbols appears on the plurality of display areas, after the plurality of symbols is rearranged;

wherein the controller is operable to provide the payout for the second winning condition only when the first winning condition is not met.

6. A slot machine comprising:

a display having a plurality of display areas for displaying symbols in a matrix format and a payline set across on the plurality of display areas; and a controller operable to:

(a) execute a rearrangement control to rearrange symbols determined arbitrarily among a plurality of kinds of symbols on the plurality of display areas after scrolling the symbols; and (b) provide a payout on at least one of (i) a first winning condition when a specific combination of the symbols appears on the payline and (ii) a second winning condition where a predetermined number of scatter symbols appears on the plurality of display areas, after the plurality of symbols is rearranged;

wherein the controller is operable to provide a total payout for the first winning condition and the second winning condition when the first winning condition and the second winning condition are met concurrently.

7. A playing method of a slot machine, the slot machine including a controller and a display having a plurality of display areas for displaying symbols in a matrix format and a payline set across the plurality of display areas, the playing method comprising:

(a) by the controller, rearranging the symbols that have been arranged on the plurality of display areas; and (b) by the controller, providing a payout on at least one of (i) a first winning condition where a specific combination of symbols appears on the payline and (ii) a second winning condition where a predetermined number of scatter symbols appears on the plurality of display areas, after the symbols are rearranged, wherein the payout for the second winning condition is provided by the controller only when the first winning condition is not met.

8. A playing method of a slot machine, the slot machine including a controller and a display having a plurality of display areas for displaying symbols in a matrix format and a payline display areas, the playing method comprising:

(a) by the controller, rearranging the symbols that have been arranged on the plurality of display areas; and (b) by the controller, providing a payout on at least one of (i) a first winning condition where a specific combination of symbols appears on the payline and (ii) a second winning condition where a predetermined number of scatter symbols appears on the plurality of display areas, after the symbols are rearranged, wherein a total payout for the first winning condition and the second winning condition is provided when the first winning condition and the second winning condition are met concurrently.

9. A playing method of a slot machine, the slot machine including a controller and a display having a plurality of display areas for displaying symbols in a matrix format and a payline set across the plurality of display areas, the playing method comprising:

(a) by the controller, arranging symbols on the plurality of display areas, (b) by the controller, determining symbols for rearrangement of the arranged symbols, (c) by the controller, rearranging the arranged symbols on the plurality of display areas, and (d) by the controller, providing a first payout for a first winning condition when a specific combination of symbols appears on the payline and a second payout for a second winning condition when a predetermined number of scatter symbols appears on the plurality of display areas, after the arranged symbols are rearranged, wherein the second payout is provided by the controller only when the first winning condition is not met and the second winning condition is met.

10. A playing method of a slot machine, the slot machine including a controller and a display having a plurality of display areas for displaying symbols in a matrix format and a payline set across the plurality of display areas, the playing method, comprising:

(a) by the controller, arranging symbols on the plurality of display areas, (b) by the controller, determining symbols for rearrangement of the arranged symbols, (c) by the controller, rearranging the arranged symbols on the plurality of display area, and (d) by the controller, providing a first payout for a first winning condition when a specific combination of symbols appears on the payline and a second payout for a second winning condition when a predetermined number of scatter symbols appears on the plurality of display areas, after the arranged symbols are rearranged, wherein a total payout for the first payout and the second payout is provided when the first winning condition and the second winning condition are met concurrently.

11. A playing method of a slot machine, the slot machine including a controller that executes unit games repeatedly a display having a plurality of display areas for displaying symbols in a matrix format and a payline set across the plurality of display areas, wherein each of the unit games is started by scrolling symbols on the display areas by the controller and ended by stopping the scrolled symbols by the controller, the playing method comprising:

a first step in which symbols are rearranged on the plurality of display areas;

a second step in which it is determined whether a specific combination of the symbols appears on the payline meets a first winning condition after the arranged symbols are rearranged;

a third step in which it is determined whether a predetermined number of scatter symbols appears on the plurality of display areas meets a second winning condition after the arranged symbols are rearranged; and a fourth step in which a first payout is provided when the first winning condition is met and a second payout is provided when the second winning condition is met, wherein the second payout is provided only when the first winning condition is not met and the second winning condition is met.

12. A playing method of a slot machine, the slot machine including a controller that executes unit games repeatedly and a display having a plurality of display areas for displaying symbols in a matrix format and a payline set across the plurality of display areas, wherein each of the unit games is started by scrolling symbols on the display areas by the controller and ended by stopping the scrolled symbols by the controller, the playing method comprising:

a first step in which symbols are rearranged on the plurality of display areas;

a second step in which it is determined whether a specific combination of the symbols appears on the payline meets a first winning condition after the arranged symbols are rearranged;

a third step in which it is determined whether a predetermined number of scatter symbols appears on the plurality of display areas meets a second winning condition after the arranged symbols are rearranged; and a fourth step in which a first payout is provided when the first winning condition is met and a second payout is provided when the second winning condition is met, wherein a total payout for the first payout and the second payout is provided when the first winning condition and the second winning condition are met concurrently.

* * * * *